March 19, 1968

KIMIKAZU AZUMA 3,374,300

PROCESS AND APPARATUS FOR THE CONTINUOUS PRODUCTION OF
POLYSTYRENIC FOAM MATERIALS

Filed July 6, 1964

INVENTOR.
KIMIKAZU AZUMA
BY
*Woodhams, Blanchard & Flynn*
ATTORNEYS

March 19, 1968 KIMIKAZU AZUMA 3,374,300
PROCESS AND APPARATUS FOR THE CONTINUOUS PRODUCTION OF
POLYSTYRENIC FOAM MATERIALS
Filed July 6, 1964 3 Sheets-Sheet 2

INVENTOR.
KIMIKAZU AZUMA
BY
Woodhams, Blanchard & Flynn
ATTORNEYS

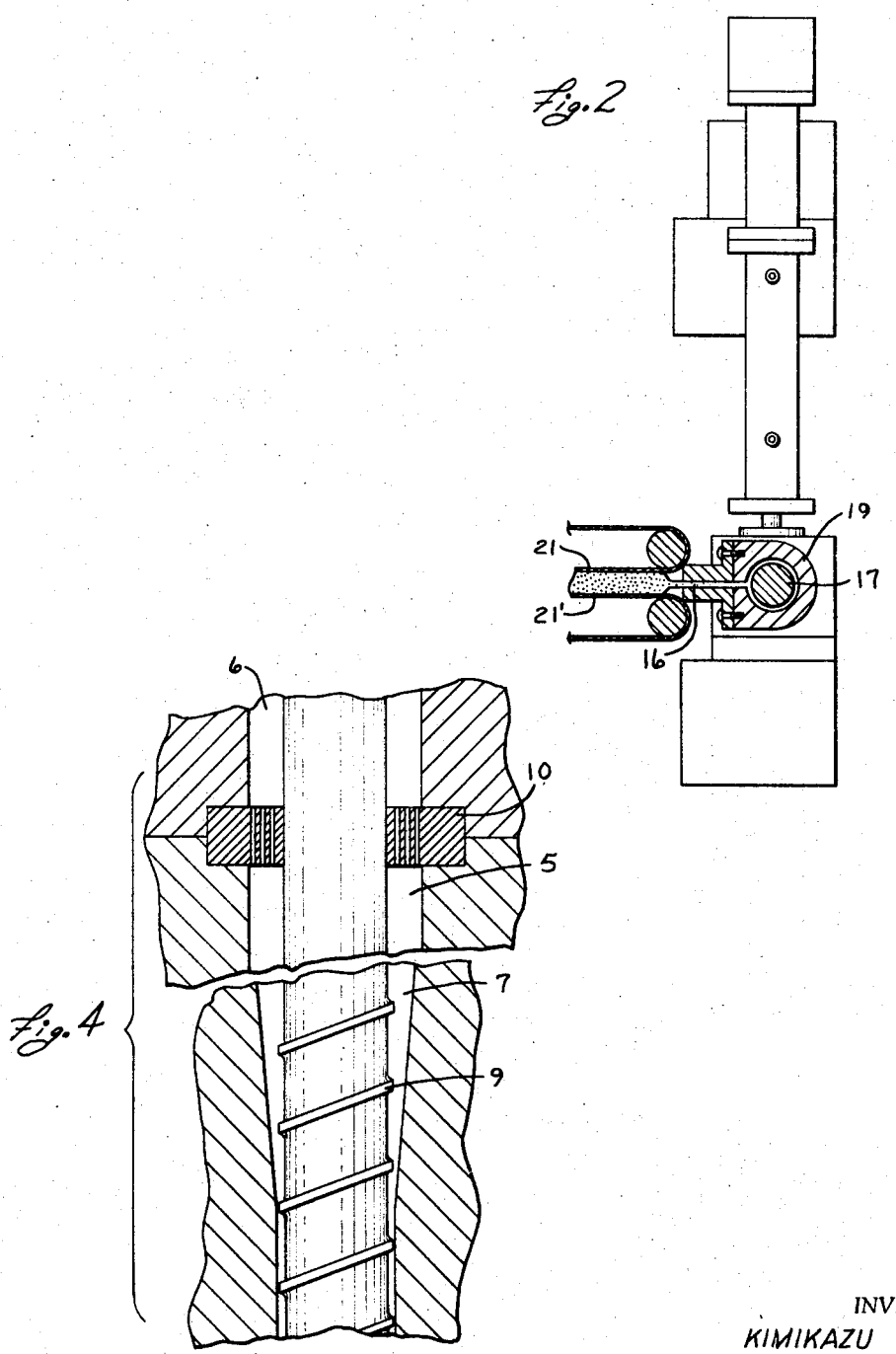

United States Patent Office 3,374,300
Patented Mar. 19, 1968

3,374,300
PROCESS AND APPARATUS FOR THE CONTINUOUS PRODUCTION OF POLYSTYRENIC FOAM MATERIALS
Kimikazu Azuma, 6703 Kugenuma Fujisawa-shi, Kanagawa-ken, Japan
Filed July 6, 1964, Ser. No. 380,581
Claims priority, application Japan, Oct. 12, 1963, 38/54,382; Oct. 14, 1963, 38/55,171
7 Claims. (Cl. 264—46)

ABSTRACT OF THE DISCLOSURE

A process and an apparatus for the continuous manufacture of a uniform foamed product in which a melted thermoplastic resin containing a foaming agent uniformly intermixed therein is fed into a screw extruder, the housing of which has a plurality of orifices uniformly axially spaced along one side thereof. A low pressure shaping chamber is positioned outside of the extruder housing and adjacent said one side thereof for receiving the material extruded through the plurality of orifices. Rotation of the screw of said extruder applies pressure to the melted resin mass whereby the melted material is forced through the plurality of orifices so as to form a plurality of individual strands. The strands pass into the shaping chamber which permits the strands to expand to form a foam material. The strands coalesce to form an integral foamed body.

---

This invention relates to a process and an apparatus for producing continuously a foam material having a uniform density, in particular, unitary sheet- or web-form articles of substantial thickness.

A process for producing polystyrene from materials has been known heretofore according to which a foamable polystyrene resin (foamable beads) is placed in a metal mold, a gas produced by the thermal decomposition of a foaming agent is dissolved or dispersed in the polystyrene under pressure to form a pre-molding, the pre-molding is heated to about 110° C. to generate a further foam whereby the pre-molding expands due to the expansion pressure of the foam material itself. A pressure is applied from the outside onto the molding material so that the material is molded and then the molding is solidified by cooling. However, according to such a conventional process, not only is the molding operation discontinuous but also the production cost is relatively high because foamable beads are used as the raw material. Therefore, another process has been recently proposed according to which a foaming agent is dispersed under pressure in polystyrene which is in the state of a fluid gel or a solution and the product is directly formed into a foam material by extrusion. The latter process is to some extent satisfactory if the article to be produced is a film or a thin sheet, but if the article to be produced has a comparatively great thickness, the distribution of gas produced during the foaming expansion becomes heterogeneous because expansion in the depth direction of the article is promoted but expansion in the width direction is suppressed, which results in an unevenness in the foam structure of the produced article or even leaves non-foamed portions in the article.

I have found, as the results of various studies for overcoming such drawbacks and obtaining foam materials having uniform densities, that the unevenness occurring in the formation of the foam can be cured by the following method. According to this invention, there is provided an improvement in the process for the production of a foam material which comprises the known steps of heating a mixture of a thermo-plastic resin mainly consisting of polystyrene and desired compounding materials, adding under pressure a foaming agent into the mixture and extruding it in the air, which improvement comprises extruding the molten resin composition through nozzles into the air in the form of a multitude of closely adjacent ropes, or strands, said nozzles being spaced apart in a sidewise direction at uniform intervals, and then combining the adjacent rope-form foamable materials into a unitary product by expansion. The invention further relates to an apparatus for carrying out this process.

The objects and advantages of this invention will become apparent to persons acquainted with processes and apparatus of this type upon reading the following description and inspecting the attached drawings, in which:

FIGURE 2 is a sectional view taken along the line II—II of FIGURE 1.

FIGURE 4 is a fragmentary, enlarged view of a portion of FIGURE 1.

In general, the apparatus of this invention comprises of a heating chamber, means for mixing a foaming agent with the heated resin in the heating chamber and an extruder each having improved structure. The embodiment of the invention shown in FIGURE 1 to FIGURE 4, is adapted to form continuous foam articles from a thermo-plastic resin composition.

Figure 1:
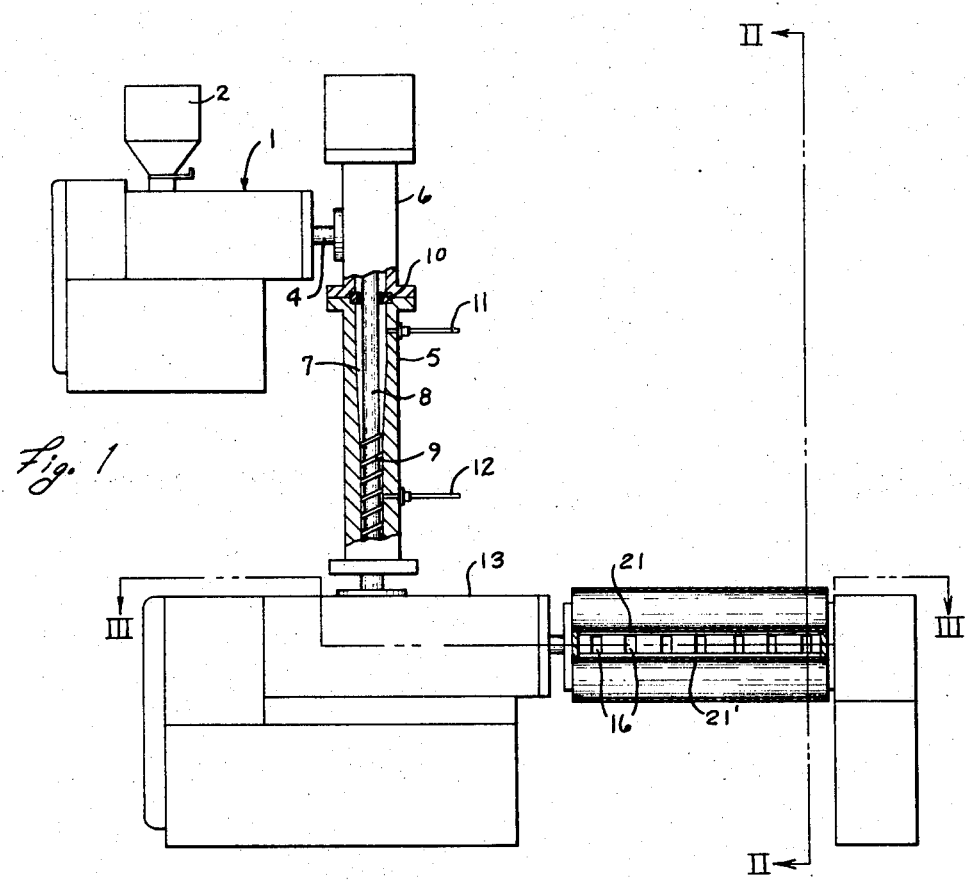
FIGURE 1 is a front elevational view of an apparatus according to this invention, with parts thereof being broken away and shown in cross-section.

Referring to FIGURE 1, a feed resin is mixed thoroughly with desired compounding agents, e.g., nucleus forming agents, such as finely divided perlite of above 300 mesh, by means of a ribbon blender (not shown) and the mixture is fed into the hopper 2 of a conventional extruder 1 wherein the mixture is melted. The molten resin is then fed through a conduit 4 of about 150–250 mm. length into a pressure chamber 6 mounted on the top of a heating chamber. The heating chamber 5 has an agitation zone 7 of progressively diminishing cross-sectional area whereby the melted resin is compressed as it travels downwardly. A perforated disc 10 is disposed between the chamber 6 and the chamber 5. A rotatable shaft 8 extends through the disc 10 and the lower end portion of the shaft has a screw 9 of constant pitch thereon.

The molten resin is pushed out from the pressure chamber 6 through the small diameter perforations formed in the metal disc 10 and is introduced into the agitation zone 7 in the form of fine thread-like streams. An inert gas, such as nitrogen or carbon dioxide, is fed under pressure into the zone 7 through a pipe 11 to increase the pressure in the chamber. The molten resin introduced into the chamber 5 is accumulated temporarily at the lower portion of the chamber, from whence the resin is forwarded gradually by the rotating screw 9. A foaming agent, such as pentane, is fed through a pipe 12 into the zone around the screw 9 by means of a high-pressure pump so as to be dispersed thoroughly around the nuclei produced by the nucleus forming agent in the molten resin.

The molten resin containing the foaming agent is then introduced into a conventional kneading chamber 13, wherein the resin is thoroughly kneaded, such as by a screw or other conventional mixing apparatus, while under pressure and while being maintained at a suitable temperature for foaming by means of a temperature controller. The resin is then forwarded into a nozzle extruder 15.

Figure 3:
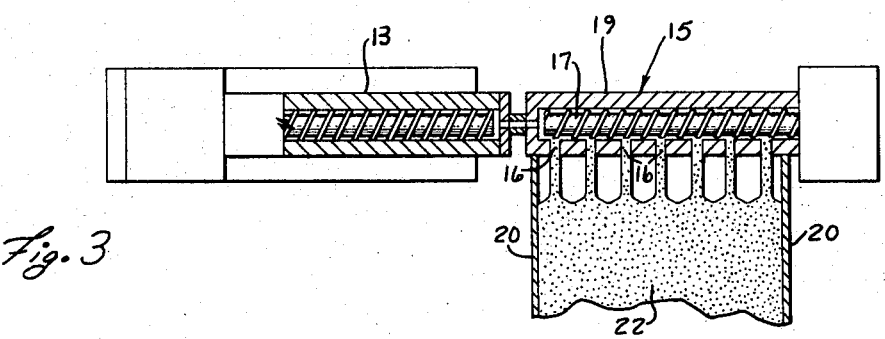
FIGURE 3 is a sectional view taken along the line III—III of FIGURE 1.

As shown in FIGURES 2 and 3, the extruder 15 consists of a hollow cylinder having a multitude of nozzles 16 formed at uniformly spaced intervals along one side of the cylinder. The nozzles preferably are linearly arranged along the side of the cylinder. A rotatable extruding screw 17 extends through the cylinder.

Figure 5:
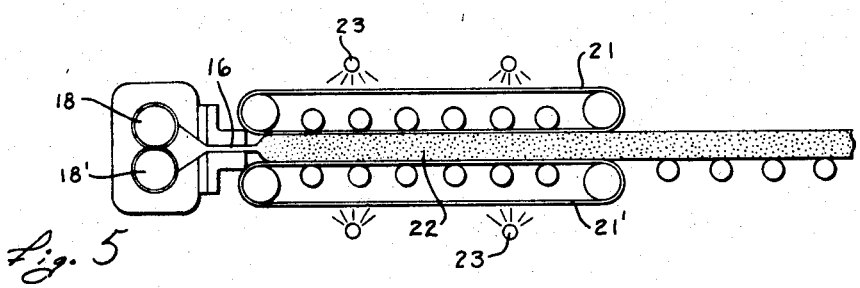
FIGURES 5, 6 and 7 are schematic sectional views showing various modifications of the nozzle and article shaping portions of the apparatus.

Instead of the single screw extruder 15 shown in FIGURES 2 and 3, the extruder may have two intermeshed screws 18, 18' as shown in FIGURE 5.

The extruder is constructed so that the molten resin can be continuously extruded in such fashion that same amount of resin flows through each nozzle 16 under the same pressure. The cylinder is surrounded by a temperature adjusting jacket 19.

The molten resin fed to the extruder 15 is extruded therefrom at a constant pressure in a state as shown in FIGURE 3, that is, in the form of a multitude of ropes or strands, into the air through the nozzles 16. The resin immediately foams and expands to a size at least about 10 times as large as its original volume, and the streams of the resin issuing from the nozzles merge and combine with each other to form a unitary sheet or board of foamed material. The foamed material flows into and is forwarded away from the extruder by a conveyer arrangement comprised of rotary wire net-like endless conveyers or belt conveyers 21, 21' located above and below the foamed material. The conveyer arrangement includes a pair of cooling side plates 20 adjacent to and extending between the edges of the belts. The foamed material is cooled and solidified by means of an air-cooling means 23 while it is molded into the desired thickness by the expansion pressure of the foaming material 22 and the pressure imposed thereon by the conveyers.

Figure 6:
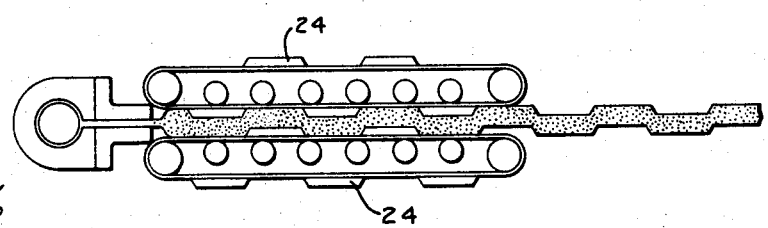
Figure 7:
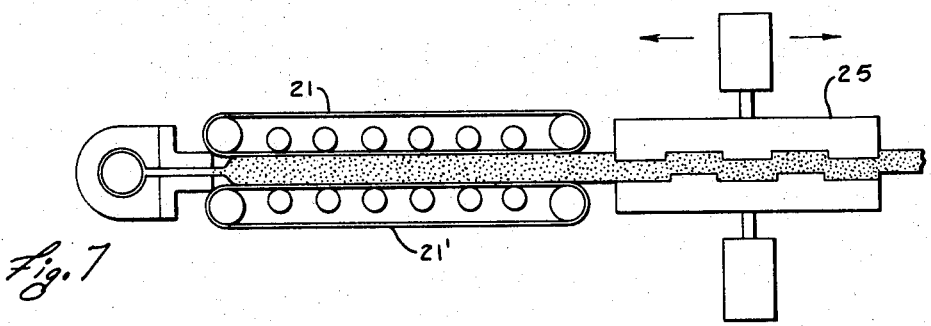

The thickness of thus produced foam material can be adjusted by adjusting the amount of the fused resin pushed out through the nozzles and by adjusting the spacing of the belts. Foamed materials having various forms and embossed patterns can be continuously produced by providing the conveyer belts with shapers 24 having suitable shapes as shown in FIGURE 6 or by placing a press device 25 directly following the conveyer as shown in FIGURE 7.

By the above-mentioned apparatus of this invention, the molten resin can be sufficiently mixed in the upper part of the heating chamber 5 by means of the disc 10, through which the resin flows downwardly in fine threads, and can be formed into a uniform foamable heated resin by means of the screw 9 placed in the agitation zone 7, by which the foaming agent fed into the molten resin can be dispersed uniformly with the aid of the action of the inert gas fed thereinto.

A most important point is to insure a uniform density of the foam material produced by the foaming of the foamable heated resin and for this purpose the nozzles 16 in the side of the extruding cylinder and spaced apart constant intervals therealong, play an important role. That is, as the foamable heated resin is pushed out into the air through the nozzles, it can sufficiently foam while it is in a rope or strand form of small diameter so that the rope-form resin can expand easily in the radial direction whereby adjacent ropes of the resin immediately merge and combine to form a unitary foam material. In this case the inside structure (density) of the produced foam material becomes very uniform because the expansion action occurs uniformly in the radial direction. Therefore, the process and the apparatus of this invention can be effectively applied to the production of thick articles of foam materials, of uniform density, in contrast to the heterogeneous density in the inner and outer layers of materials produced by conventional methods and apparatuses.

As the resin used in this invention, there can be used, besides polystyrene, copolymers of polystyrene, such as copolymers of polystyrene and polyethylene, polypropylene, polyvinyl chloride, polyacrylonitrile, polyamide, polyester, vinyl acetate, etc., and the like. Scraps of polystyrene or scraps of polystyrene foam materials can also be used.

As the foaming agent, a gas, such as propane, or a liquid, such as pentane, butane, or hexane, may be used.

According to the present invention, foam material articles having uniform inside structures (density) can be easily and effectively obtained and the production cost can be effectively reduced since scraps of polystyrene and the like can be used as the raw materials.

Typical examples of this invention are as follows:

Example 1

A mixture of 100% (by weight) polystyrene and 2.5% perlite fine powders (300 mesh) as nuclei, prepared by mixing in a ribbon blender was charged into the extruder, wherein it was heated to 150° C., and it was then fed into the chamber 6, in which the temperature and the pressure were maintained at 220° C., and 220 kg./cm$^2$. respectively. The heated resin was fed down from the chamber 6 into the chamber 5 through the disc 10 in the forms of threads and was allowed to remain in the lower zone of the chamber 5 temporarily. The molten resin was then fed downwardly and agitated by screw 9 while a mixture of 10% pentane as a foaming agent and 1% of a plasticizer dioctyl phthalate was fed into it by means of a high-pressure pump, and nitrogen was fed in from above to increase the pressure in the chamber, whereby the foaming agent was attached to the nuclei and was dispersed and dissolved into the molten resin. Then the resin was fed into the second extruder 13. The temperature of the molten resin was modified to 120° C., the resin was sent to the final extruder 15 and was extruded through nozzles 16 in rope- or strand-form into the air by the screw 17. The ropes of resin immediately expanded by forming and combined with each other to form a unitary sheet, which was continuously moved away from the extruder 15 by the conveyer. The foam produced was cooled and shaped by the cooling side plates and conveyers to provide a uniform integral foam material product of 50 mm. in thickness.

Example 2

By carrying out the process as in Example 1 using non-foamed polystyrene scraps, instead of polystyrene, as the raw material, a good quality, unitary foam product was obtained.

Example 3

By carrying out the process as in Example 1 using scraps of foamed polystyrene, instead of polystyrene, as the raw material, a foam material having uniform inside density was obtained.

Example 4

By carrying out the process as in Example 1 using a copolymer of styrene and ethylene, instead of polystyrene, as the raw material, a foam material having uniform density was obtained.

Example 5

By carrying out the process as in Example 1 using a blend polymer of polystyrene and polypropylene, instead of polystyrene as the raw material, a uniform foam material was obtained.

Although particular preferred embodiments of the invention have been described above in detail for illustrative purposes, it will be recognized that variations or modifications of such disclosure, which lie within the scope of the appended claims, are fully contemplated.

What is claimed is:
1. A process for the continuous production of a uniform density foam material made of thermoplastic resin, which comprises:
feeding thermoplastic resin into an extruder;
continuously forwarding said thermoplastic resin through said extruder and melting said thermoplastic resin as it flows through said extruder;

continuously flowing the melted thermoplastic resin discharged from the extruder downwardly and dividing the melted thermoplastic resin into a plurality of downwardly moving separate spaced-apart streams of small cross-sectional area as the thermoplastic resin flows downwardly;

flowing said streams downwardly through an upright elongated chamber in spaced relationship to one another with free spaces existing between and substantially completely surrounding the individual streams;

recombining the streams in the lower portion of said chamber;

injecting a foaming agent into said chamber so that said foaming agent moves into contact with and is absorbed by said melted thermoplastic resin while said resin is at an elevated temperature and pressure, the foaming agent being added in an amount capable of causing expansion of the resin upon release of pressure therefrom and the foaming agent being mixed substantially uniformly with the melted thermoplastic resin to form a foamable composition while maintaining a sufficient pressure thereon to prevent expansion of the foaming agent;

continuously forwarding the foamable composition under a pressure sufficient to prevent expansion of the foaming agent into an extruder cylinder having elongated, rotating screw means therein and having a series of uniformly spaced discharge openings along one axial side thereof and spaced apart lengthwise along said screw means, the foamable composition being advanced along and filling the extruder cylinder and being under substantially the same pressure sufficient to prevent expansion of the foaming agent throughout the entire length of the cylinder;

continuously extruding substantially the same amount of foamable composition sidewardly from the extruder cylinder in a direction transverse to the axis of rotation of said screw means through each opening under the same pressure whereby a series of strands of the foamable composition are simultaneously extruded, said strands being of substantially uniform density;

allowing the foaming agent in the respective strands to expand after the strands leave the extruder cylinder in order to foam the composition; and permitting the strands to coalesce and unite with each other in order to form a unitary foamed body of substantially uniform density.

2. A process according to claim 1, including the additional step of subjecting the melted thermoplastic resin to a gaseous pressure by means of an inert gas contained within the spaces between the streams for forcing the mass out of said chamber.

3. An apparatus for the continuous production of thermoplastic foam material, comprising:

a first extruder for melting a thermoplastic resin;

wall means defining an upright chamber having an inlet at one end thereof and an outlet at the other end thereof, said inlet being connected to the discharge end of said first extruder;

stationary perforate means mounted within said chamber and dividing said chamber into a pressure zone adjacent the inlet and an agitation zone adjacent the outlet, said perforate means dividing the melted thermoplastic resin into a plurality of small downwardly flowing spaced-apart streams;

injection means for supplying a foaming agent through said wall means into the agitation zone;

mechanical blending means mounted within said agitation zone defined within said wall means adapted to thoroughly mix said melted thermoplastic resin and said foaming agent into a homogeneous mass;

extruder means connected to said outlet for receiving the homogeneous mass, said extruder means including a housing having an elongated substantially cylindrical chamber therein and elongated screw means rotatably mounted in said chamber, said housing having a plurality of small uniformly spaced nozzles linearly arranged along one axial side thereof and spaced apart lengthwise of said screw means so that the molten foamable material is extruded through the nozzles in the form of strands which are permitted to expand by foaming and simultaneously combine to form a unitary foamed body; and conveying and shaping means positioned adjacent said housing for shaping the foamed body and moving it away from the housing.

4. The apparatus as defined in claim 3, in which said extruder means includes a kneading extruder positioned between the agitation zone and said housing, said kneading extruder having means for kneading the foamable material and adjusting the temperature thereof.

5. The apparatus according to claim 4, wherein said conveying and shaping means comprises first and second endless conveyer belts positioned on opposite sides of said linearly arranged plurality of orifices so as to form a channel therebetween for limiting the expansion of said foamable material.

6. The apparatus according to claim 5, wherein said first and second conveyer belts each contain embossing plates on the adjacent surfaces thereof for forming the foamed material to the desired configuration.

7. The apparatus according to claim 5, further including press means mounted at the end of said conveying and shaping means opposite said housing adapted to perform additional forming operations on said foamed body.

References Cited

UNITED STATES PATENTS

| | | |
|---|---|---|
| 1,980,898 | 11/1934 | Abernethy. |
| 2,350,996 | 6/1944 | Atkinson et al. ____ 264—286 X |
| 2,437,460 | 3/1948 | De Francisci _____ 18—12 X |
| 2,655,196 | 10/1953 | Magnani _____ 264—286 X |
| 2,669,751 | 2/1954 | McCurdy et al. |
| 2,740,157 | 4/1956 | McCurdy et al. _____ 264—53 |
| 2,836,851 | 6/1958 | Holt. |
| 2,874,408 | 2/1959 | Vieli et al. _____ 264—286 X |
| 3,094,449 | 6/1963 | Sisson _____ 264—53 X |
| 3,121,130 | 2/1964 | Wiley et al. _____ 264—53 |
| 3,160,688 | 12/1964 | Aykanian et al. _____ 264—53 |

FOREIGN PATENTS 842,402   6/1952   Germany.

ALEXANDER H. BRODMERKEL, *Primary Examiner.*

P. E. ANDERSON, *Assistant Examiner.*